United States Patent
Döhler et al.

(10) Patent No.: US 6,268,404 B1
(45) Date of Patent: Jul. 31, 2001

(54) RADIATION-CURABLE ORGANOSILOXANE COATING COMPOSITIONS

(75) Inventors: Hardi Döhler, Hattingen; Thomas Ebbrecht, Bochum; Winfried Hamann, Essen; Peter Lersch, Oberhausen; Stefan Stadtmüller, Essen, all of (DE)

(73) Assignee: Th. Goldschmidt AG, Essen (DE)

( * ) Notice: Subject to any disclaimer, the term of this patent is extended or adjusted under 35 U.S.C. 154(b) by 0 days.

(21) Appl. No.: 09/370,710

(22) Filed: Aug. 9, 1999

(30) Foreign Application Priority Data

Aug. 11, 1998 (DE) ................................. 198 36 246

(51) Int. Cl.[7] ........................... C09D 183/07; C08F 2/46; C08L 83/07
(52) U.S. Cl. ............................ 522/99; 522/172; 525/474; 525/477; 525/479; 528/33; 427/515; 427/516; 428/352; 428/447
(58) Field of Search ................ 522/99, 172; 528/26, 528/32, 33, 41; 525/477, 479, 474; 428/352, 447; 427/515, 516

(56) References Cited

U.S. PATENT DOCUMENTS

| | | | |
|---|---|---|---|
| 4,908,274 | * | 3/1990 | Jachmann et al. . |
| 4,963,438 | * | 10/1990 | Weitemeyer et al. . |
| 4,978,726 | * | 12/1990 | Dohler et al. . |
| 5,034,491 | * | 7/1991 | Wewers et al. . |
| 5,552,506 | | 9/1996 | Ebbrecht et al. . |
| 5,977,282 | * | 11/1999 | Ebbrecht et al. . |

FOREIGN PATENT DOCUMENTS

| | | |
|---|---|---|
| 27 47 233 C3 | 7/1978 | (DE) . |
| 29 48 708 C2 | 8/1980 | (DE) . |
| 38 10 140 C1 | 10/1989 | (DE) . |
| 38 20 294 C1 | 10/1989 | (DE) . |

* cited by examiner

*Primary Examiner*—Susan W. Berman
(74) *Attorney, Agent, or Firm*—Frommer Lawrence & Haug LLP

(57) ABSTRACT

This invention provides radiation-curing coating compositions comprising a mixture of organopolysiloxanes modified laterally and terminally with acrylic groups, which exhibit markedly improved adhesion to a variety of substrates following curing and for which there is little or no change in the adhesiveness on storage for prolonged periods.

14 Claims, No Drawings

RADIATION-CURABLE ORGANOSILOXANE COATING COMPOSITIONS

BACKGROUND OF THE INVENTION

1. Field of the Invention

The present invention relates to radiation-curable coating compositions having improved properties, such as adhesion to the substrate and release properties which are stable over time.

2. Background of the Invention

Polysiloxanes containing acrylate acid ester groups (acrylate groups) have become established as binders which can be cured under high-energy radiation for applications such as printing inks and for producing film-forming binders or for coating materials for surfaces of plastic, paper, wood and metal. Curing takes place in particular by UV radiation (following the addition of known photoinitiators, such as benzophenone and its derivatives, for example) or by means of electron beams.

3. Description of the Related Art

Acrylate-modified organosiloxanes are described in numerous patent documents. The following patents and applications are cited as representatives of the prior art.

Organopolysiloxanes in which the acrylate-containing organic groups are connected to the polysiloxane framework by way of an Si—O—C bond can be prepared in accordance with a process of DE-C-27 47 233 by reacting —COH-containing (meth)acrylic esters with organopolysiloxanes which have SiX groups (X=alkoxy, hydroxyl or chlorine) wherein the organopolysiloxanes used are of the formula

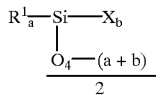

$R^1$ = alkyl group of 1 to 4 carbon atoms and/or a phenyl group;
X = chlorine or a group $OR^2$;
$R^2$ = alkyl group of 1 to 4 carbon atoms and/or hydrogen;
a = 1.0 to 2.0;
b = 0.02 to 1.6;
a + b ≤ 2.66 and the siloxane molecule has 3 to 100 silicon atoms and, as the (meth)acrylic ester, using pentaerythritol tri(meth) acrylate, from 0.05 mol to equimolar amounts of the pentaerythritol ester being employed relative to COH and SiX groups.

In a modification of this process the procedure in accordance with DE-C-29 48 708 is to react organopolysiloxanes of the formula

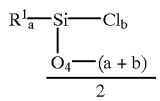

($R^1$=alkyl of 1 to 4 carbon atoms, vinyl and/or phenyl with the proviso that at least 90 mol % of the groups $R^1$ are methyl; a=from 1.8 to 2.2; b=from 0.004 to 0.5) first of all with at least twice the molar amount, based on SiCl groups, of a dialkylamine whose alkyl groups each have 3 to 5 carbon atoms and in which the carbon atoms adjacent to the nitrogen each carry not more than one hydrogen atom and then reacting the product of this first reaction with at least equimolar amounts of pentaerythritol triacrylate or pentaerythritol trimethacrylate and, subsequently, in a manner known per se, separating off the product of the process from solid constituents suspended in it.

Organopolysiloxanes, in which the acrylic ester-containing organic groups are connected to the polysiloxane framework by way of Si—C bonds can be prepared, for example, by subjecting allyl glycidyl ether or another suitable epoxide having an olefinic double bond to an addition reaction with a hydrosiloxane and, following the addition reaction, esterifying the epoxide with acrylic acid to open the epoxide ring. This procedure is described in DE-C-38 20 294.

A further possibility for the preparation of acrylate-modified polysiloxanes with Si—C linkage of the modifying group(s) is to subject an alcohol having an olefinic double bond, such as allyl alcohol, to an addition reaction with a hydrosiloxane in the presence of a platinum catalyst and then to react the OH group of this alcohol with acrylic acid or with a mixture of acrylic acid and other, saturated or unsaturated acids. This procedure is described, for example, in DE-C-38 10 140.

When considering unbranched organopolysiloxanes, modification can take place at the two terminal siloxydimethyl units or at one or more siloxymethyl units within the siloxane chain. Accordingly, one talks of terminally or laterally modified polysiloxanes. The modification can also be both terminal and lateral; in the text below, such modifications are included among the laterally modified products.

It has been found in practice that abhesive coatings produced with terminally (meth)acrylate-modified organopolysiloxanes on sheetlike supports, for use in adhesive tapes or label laminates, for example, feature low release values, which are stable over time, since such polysiloxanes have a high silicone character which is not interrupted by organic modifications within the siloxane chain. To achieve good adhesion to the substrate, however, a relatively high modification density with reactive groups is necessary. This is difficult to achieve with terminally modified siloxanes, since the siloxane chain would have to be shortened correspondingly. Such short-chain terminally modified polysiloxanes are comparatively expensive, so their use would be uneconomic.

Laterally modified silicone (meth)acrylates, on the other hand, can be varied over wide ranges in their modification density independently of the molecular weight. Since lateral (meth)acrylate groups are known to be less reactive owing to their steric hindrance, there is a risk that not all groups will react completely during the polymerization. Such residual, uncrosslinked acrylate groups can then enter into follow-on reactions—for example, with the pressure-sensitive adhesive of a label laminate—which would, over time, lead to an increase in the release values.

OBJECT OF THE INVENTION

It is an object of the present invention to develop radiation-curable coating compositions which have good adhesion to the substrate and which possess release properties which are stable over time.

SUMMARY OF THE INVENTION

It has been found that radiation-curing coating compositions consisting of mixtures of laterally and terminally (meth)acrylate-modified organopolysiloxanes of the general formulae (I) and (II), described infra, possess such required properties.

Surprisingly, it has been discovered that within such mixtures of the invention the advantages of the individual components are manifested whereas the disadvantages described above are compensated by the other component and do not become effective. While not wishing to be bound by theory, this profile of properties could be explained by the following hypothesis. Directly after coating on a sheetlike support, there is a gradual separation of the mixture even before the crosslinking of the reactive units, with the more strongly polar, laterally modified component orienting itself toward the substrate and the less polar, terminally modified component orienting itself toward the surface. After curing, the laterally modified component is responsible for good anchorage to the substrate while the terminally modified component at the surface determines the favorable release properties. The consequence of this for the coating compositions of the invention is the following improved profile of properties:

1. The coating compositions of the invention, after curing, exhibit considerably improved adhesion to a variety of substrates (such as paper, and polymer film, for example).
2. There is little or no change in the abhesiveness of the cured coatings on storage for prolonged periods, which would be evident through an increase in the release values.
3. In addition, the coating compositions can be cured at high processing speeds on support materials.

The radiation-curable coating compositions of the invention comprising (A) from about 10 to about 90% by weight of one or more laterally modified organopolysiloxanes of the general formula (I)

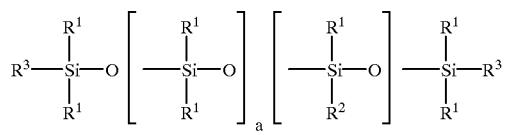

$R^1$ = identical or different aliphatic or aromatic hydrocarbon radicals, $R^2$ = a linear, cyclic, aromatic or branched hydrocarbon radical, with or without ether bridges, to which there are attached, by way of ester linkages, from 1 to 5 acrylic and/or methacrylic acid units and, optionally, monocarboxylic acid units which are free of polymerizable double bonds, $R^3 = R^1$ or $R^2$, a = 0 to 300, b = 1 to 25, (B) from about 10 to about 90% by weight of one or more terminally modified organopolysiloxanes of the general formula (II)

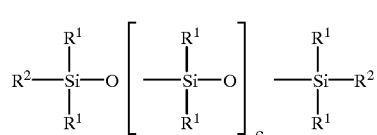

in which $R^1$ and $R^2$ are as defined above and c=5 to 500.

DESCRIPTION OF THE PREFERRED EMBODIMENTS

In a preferred embodiment $R^1$ is an aliphatic or aromatic hydrocarbon radical of 1 to 10 carbon atoms and $R^2$ is a linear, cyclic, aromatic or branched hydrocarbon radical of 1 to 20 carbon atoms; preferably the monocarboxylic acid unit have 2 to 10 carbon atoms.

Preference is given to mixtures of components (I) and (II) in a ratio of from about 80:20 to about 20:80 where a=0 to 200, b=3 to 20 and c=5 to 300. Particular preference is given to mixtures of components (I) and (II) in a ratio of from about 75:25 to about 25:75 with a=0 to 100, b=5 to 15 and c=15 to 200.

Particularly preferred groups for $R^2$ is as follows:

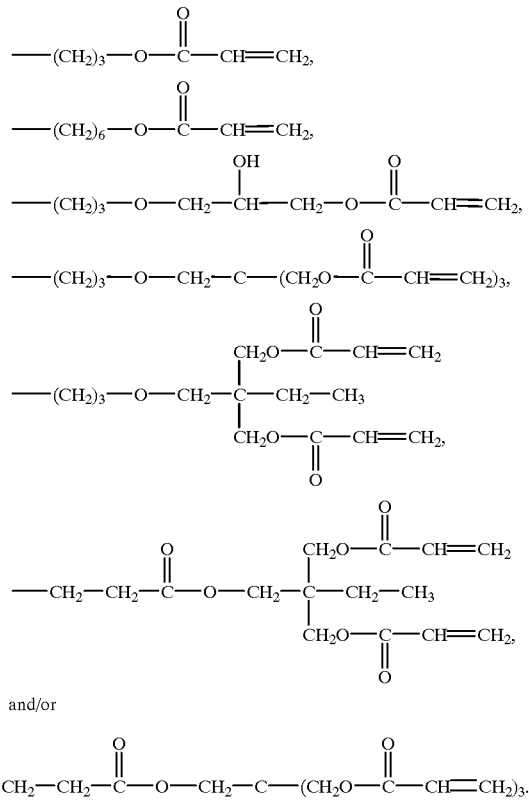

and/or $$—CH_2—CH_2—\overset{O}{\underset{\|}{C}}—O—CH_2—C—(CH_2O—\overset{O}{\underset{\|}{C}}—CH=CH_2)_3.$$

The radiation-curing coating compositions of the invention can be compounded with conventional curing initiators, fillers, pigments, other acrylate systems, known per se in the art, and further customary additives. The compositions of the invention can be crosslinked three-dimensionally by free radicals and cure thermally with the addition of, for example, peroxides or cure under the influence of high-energy radiation, such as UV radiation or electron beams, within a very short time to form mechanically and chemically resistant films which, given an appropriate composition of the coating compositions of the invention, have predeterminable abhesive properties. If UV light is used as the source of radiation, crosslinking takes place preferably in the presence of photoinitiators and/or photosensitizers, such as benzophenone and its derivatives or benzoin and corresponding substituted benzoin derivatives.

Photoinitiators and/or photosensitizers are used in the coating compositions of the invention preferably in amounts of from about 0.01 to about 10% by weight, in particular from about 0.1 to about 5% by weight, based in each case on the weight of the acrylate-functional organopolysiloxanes.

The individual components of the coating compositions of the invention of the general formulae (I) and (II) are compounds known from the prior art whose preparation is described, for example, in "Chemie und Technologie der Silicone" by W. Noll, Verlag Chemie 1968 and, for example, in the following documents and the literature cited therein: DE-C-38 20 294, DE-C-38 10 140, U.S. 5,552,506, German Patent Application 198 08 786.1, all herein incorporated by reference.

EXAMPLES

The examples which follow are intended to illustrate the invention, and do not constitute any restriction whatsoever.

Terminally Modified Silicone Acrylates

Release Value

The release values were determined using various adhesive tapes from Beiersdorf which were 25 mm wide: specifically, an adhesive tape coated with acrylate adhesive, obtained commercially under the designation TESA® 7475, and adhesive tapes coated with rubber adhesive, obtained commercially under the designations TESA® 4154 and TESA® 7476.

To measure the abhesiveness, these adhesive tapes were rolled onto the substrate and then stored at 40° C. under a weight of 70 g/cm². After 24 hours, a measurement was made of the force required to peel the respective adhesive

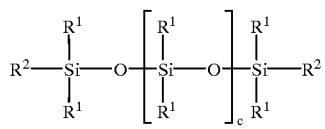

| Compound | $R^1$ | $R^2$ | c |
|---|---|---|---|
| V1 | $CH_3$ | $-(CH_2)_6-O-\overset{O}{\underset{\|}{C}}-CH=CH_2$ | 30 |
| V2 | $CH_3$ | $-(CH_2)_3-O-CH_2-\underset{\underset{CH_2O-C(=O)-CH=CH_2}{\|}}{\overset{\overset{CH_2O-C(=O)-CH=CH_2}{\|}}{C}}-CH_2-CH_3$ | 80 |

Laterally Modified Silicone Acrylates

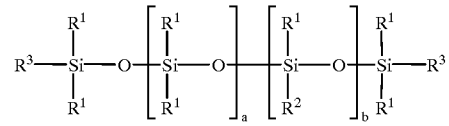

| Compound | $R^1$ | $R^2$ | $R^3$ | a | b |
|---|---|---|---|---|---|
| V3 | $CH_3$ | $-(CH_2)_6-O-\overset{O}{\underset{\|}{C}}-CH=CH_2$ | $-(CH_2)_6-O-\overset{O}{\underset{\|}{C}}-CH=CH_2$ | 15 | 5 |
| V4 | $CH_3$ | $-(CH_2)_3-O-CH_2-\underset{\underset{OH}{\|}}{CH}-CH_2-O-\overset{O}{\underset{\|}{C}}-CH=CH_2$ | $CH_3$ | 10 | 4 |

Performance Testing

To test the performance properties of the coating compositions to be used in accordance with the invention, the products of the examples and of the comparative examples, which are not in accordance with the invention, were applied to sheetlike supports (oriented polypropylene film) and, following the addition of 2% photoinitiator (Darocur® 1173, Ciba Geigy), cured by exposure to UV light at 120 W/cm under a nitrogen atmosphere and with a belt speed of 20 m/min. The amount applied in each case was about 1 g/m².

tape from the substrate at a rate of 30 cm/min and a peel angle of 180°. This force was designated the release force or release value. The general test procedure corresponds essentially to FINAT Test Method No. 10. To test the aging behavior, the storage time was extended to 7 and 14 days under the conditions described above.

Loop Test

The purpose of the loop test is to determine rapidly the degree of curing of a release coating. For this purpose a strip about 20 cm long of the adhesive tape TESA® 4154 from Beiersdorf was rolled three times onto the substrate and peeled off again immediately by hand. Then a loop was formed by placing the ends of the adhesive tape together, so that the adhesive faces of both ends was in contact over an extent of about one centimeters. The ends were then parted again by hand, during which the contact area should move uniformly to the center of the adhesive tape. In the case of contamination with poorly cured release material, the bond strength of the adhesive tape was no longer sufficient to maintain the contact area when the ends are pulled apart. In this case, the test was said to have been failed.

Subsequent Adhesion

The subsequent adhesion was determined largely in accordance with FINAT Test Method No. 11. For this purpose the adhesive tape TESA® 7475 from Beiersdorf was rolled onto the substrate and then stored at 40° C. under a weight of 70 g/cm$^2$. After 24 hours, the adhesive tape was separated from the release substrate and rolled onto a defined substrate (steel plate, glass plate, and film). After one minute a measurement was made of the force required to peel the adhesive tape from the substrate at a rate of 30 cm/min and a peel angle of 180°. The value thus measured was divided by the value given by an untreated adhesive tape under otherwise identical test conditions. The result is termed the subsequent adhesion and is generally indicated as a percentage.

Rub-off Test

The adhesion of the cured coating compositions to the substrate was determined by vigorous rubbing with the thumb. If adhesion was inadequate, rubberlike crumbs are formed. This test is generally referred to as the rub-off test.

TABLE 1

Blends of coating compositions consisting of components (I) and (II) Examples according to the invention percentages by weight):

| Example | V1 | V2 | V3 | V4' |
|---|---|---|---|---|
| A | 70 | | 30 | |
| B | 60 | | | 40 |
| C | | 40 | 60 | |
| D | | 50 | | 50 |

TABLE 2

Non-blended coating compositions (examples not in accordance with the invention)

| Example | V1 | V2 | V3 | V4' |
|---|---|---|---|---|
| E | 100 | | | |
| F | | 100 | | |
| G | | | 100 | |
| H | | | | 100 |

TABLE 3

Performance testing results

| Example | Rub-off test | Subsequent adhesion % | Release value TESA ® 7475 N/2.5 cm | Release value TESA ® 4154 N/2.5 cm |
|---|---|---|---|---|
| A | sat.[*] | 95 | 0.2 | 0.2 |
| B | sat. | 96 | 0.2 | 0.2 |
| C | sat. | 93 | 0.1 | 0.1 |
| D | sat. | 93 | 0.1 | 0.1 |
| E | unsat.[**] | 95 | 0.2 | 0.2 |
| F | unsat. | 93 | 0.1 | 0.1 |
| G | sat. | 97 | 3.1 | 3.2 |
| H | sat. | 98 | 2.8 | 2.5 |

[*]sat. = satisfactory
[**]unsat. = unsatisfactory

TABLE 4

Release value aging with TESA ® 7475 in cN/2.5 cm after

| Example | 1 day | 7 days | 14 days |
|---|---|---|---|
| A | 0.2 | 0.2 | 0.3 |
| B | 0.2 | 0.2 | 0.2 |
| C | 0.1 | 0.1 | 0.1 |
| D | 0.1 | 0.1 | 0.1 |
| E | 0.2 | 0.2 | 0.2 |
| F | 0.1 | 0.1 | 0.1 |
| G | 3.1 | 5.9 | 8.7 |
| H | 2.8 | 5.5 | 8.4 |

The results of the performance tests of the examples in accordance with the invention (Table 1) in comparison to the examples not in accordance with the invention (Table 2) are set out in Table 3 (rub-off test, subsequent adhesion, release values) and Table 4 (aging behavior).

Table 3 shows that coating compositions consisting of blends of linear siloxane acrylates (components of structure (II), V1 and V2) and lateral siloxane acrylates (components of structure (I), V3 and V4) feature low release values and high subsequent adhesion and at the same time exhibit high substrate adhesion. With Examples E and F as well, low release values and high subsequent adhesion are found, although here the rub-off test is failed. Examples G and H show good adhesion to the substrate with a release value which is already high initially and which, furthermore, rises after just a short time and points toward relatively rapid aging (Table 4).

In Table 4, on the other hand, there is no increase in the release values for the blends A to D, which corresponds to very good aging behavior.

The above description of the invention is intended to be illustrative and not limiting. Various changes or modifications in the embodiments described herein may occur to those skilled in the art. These changes can be made without departing from the scope or a spirit of the invention.

What is claimed is:

1. A radiation-curing coating composition comprising (A) from about 10 to about 90% by weight, based on the total weight of (A) and (B), of one or more laterally modified organopolysiloxanes of the general formula (I)

$$\text{R}^3-\underset{\underset{\text{R}^1}{|}}{\overset{\overset{\text{R}^1}{|}}{\text{Si}}}-\text{O}-\left[\underset{\underset{\text{R}^1}{|}}{\overset{\overset{\text{R}^1}{|}}{\text{Si}}}-\text{O}\right]_a-\left[\underset{\underset{\text{R}^2}{|}}{\overset{\overset{\text{R}^1}{|}}{\text{Si}}}-\text{O}\right]_b-\underset{\underset{\text{R}^1}{|}}{\overset{\overset{\text{R}^1}{|}}{\text{Si}}}-\text{R}^3 \quad (I)$$

$R^1$ = identical or different aliphatic or aromatic hydrocarbon radicals,
$R^2$ = a linear, branched or aromatic hydrocarbon radical, with or without ether bridges, to which there are attached, by way of ester linkages, from 1 to 5 acrylic and/or methacrylic acid units and, optionally, monocarboxylic acid units which are free of polymerizable double bonds,
$R^3 = R^1$ or $R^2$,
a = 0 to 300,
b = 1 to 25, (B) from about 10 to about 90% by weight, based upon the total weight of (A) and (B), of one or more terminally modified organopolysiloxanes of the general formula (II)

$$\text{R}^2-\underset{\underset{\text{R}^1}{|}}{\overset{\overset{\text{R}^1}{|}}{\text{Si}}}-\text{O}-\left[\underset{\underset{\text{R}^1}{|}}{\overset{\overset{\text{R}^1}{|}}{\text{Si}}}-\text{O}\right]_c-\underset{\underset{\text{R}^1}{|}}{\overset{\overset{\text{R}^1}{|}}{\text{Si}}}-\text{R}^2 \quad (II)$$

in which $R^1$ and $R^2$ are as defined above and
c=5 to 500.

2. A radiation-curing coating composition as claimed in claim 1, wherein $R^1$ is methyl.

3. A radiation-curing coating composition as claimed in claim 1, wherein a is from 0 to 200.

4. A radiation-curing coating composition as claimed in claim 1, wherein b is from 3 to 20.

5. A radiation-curing coating composition as claimed in claim 1, wherein c is from 5 to 300.

6. A radiation-curing coating composition as claimed in claim 1, wherein the components of structures (I) and (II) are present in a ratio of from about 80% by weight:about 20% by weight to about 20% by weight:about 80% by weight.

7. A radiation-curing coating composition as claimed in claim 1, wherein the components (I) and (II) are present in a ratio of from 75% by weight:25% by weight to 25% by weight:75% by weight, and a=0 to 100, b=5 to 15 and C=15 to 200.

8. A radiation-curing coating composition as claimed in claim 1, which comprises 10 to 90% by weight of formula (I) and 10 to 90% by weight of formula (II) and wherein
$R^1$=identical or different aliphatic or aromatic hydrocarbon radicals of 1 to 10 carbon atoms,
$R^2$=a linear, branched or aromatic hydrocarbon radical of 1 to 20 carbon atoms, with or without ether bridges, to which there are attached, by way of ester linkages, from 1 to 5 acrylic and/or methacrylic acid units and, optionally, monocarboxylic acid units of 2 to 10 carbon atoms which are free of polymerizable double bonds,
$R^3=R^1$ or $R^2$,
a=0 to 300,
b=1 to 25, and
c=5 to 50.

9. A radiation-curing coating composition as claimed in claim 1, wherein $R^2$ is

—(CH$_2$)$_3$—O—C(=O)—CH=CH$_2$,

—(CH$_2$)$_6$—O—C(=O)—CH=CH$_2$,

—(CH$_2$)$_3$—O—CH$_2$—CH(OH)—CH$_2$—O—C(=O)—CH=CH$_2$,

—(CH$_2$)$_3$—O—CH$_2$—C(—(CH$_2$O—C(=O)—CH=CH$_2$)$_3$,

—(CH$_2$)$_3$—O—CH$_2$—C(CH$_2$O—C(=O)—CH=CH$_2$)(CH$_2$—CH$_3$)(CH$_2$O—C(=O)—CH=CH$_2$),

—CH$_2$—CH$_2$—C(=O)—O—CH$_2$—C(CH$_2$O—C(=O)—CH=CH$_2$)(CH$_2$—CH$_3$)(CH$_2$O—C(=O)—CH=CH$_2$), and/or

—CH$_2$—CH$_2$—C(=O)—O—CH$_2$—C(—(CH$_2$O—C(=O)—CH=CH$_2$)$_3$.

10. A radiation-curing coating composition as claimed in claim 1, wherein the laterally modified organosiloxane is a mixture comprising two organosiloxanes of formula (I) where a) $R^1$ is CH$_3$, $R^2$ and $R^3$ are —(CH$_2$)$_6$—O—C(=O)—CH=CH$_2$, a is 15 and b is 5; and b) $R^1$ is CH$_3$, $R^2$ is —(CH$_2$)$_3$—CH$_2$—CH(OH)—CH$_2$—O—C(=O)—CH=CH$_2$, $R^3$ is CH$_3$, a is 10, and b is 4; and the terminally organo-modified organopolysiloxane is a mixture comprising two organosiloxanes of formula (II) when a) $R^1$ is CH$_3$, $R^2$ is —(CH$_2$)$_6$—O—C(=O)—CH=CH$_2$, and c is 30; and
b) $R^1$ is CH$_3$, $R^2$ is —(CH$_2$)$_3$—O—CH$_2$—C(CH$_2$—CH$_3$)(CH$_2$O—C(=O)—CH=CH$_2$)

$R^3$ is CH$_3$, and c is 80.

11. An adhesive release coating which comprises a radiation-curing coating composition according to claim 1.

12. An adhesive release coating according to claim 11, which further comprises curing initiators, fillers, pigments, organopolysiloxane(meth)acrylates, acrylate systems or additives.

13. A method for coating a material which comprises applying a radiation curing composition according to claim 11, to the surface of said material.

14. The method according to claim 13, where the material is plastic, paper, wood, or metal.

* * * * *